(12) United States Patent
Bo

(10) Patent No.: US 6,369,996 B1
(45) Date of Patent: Apr. 9, 2002

(54) FAULT PROTECTION SCHEME

(75) Inventor: Zhiqian Bo, Bath (GB)

(73) Assignee: Alstom UK Limited (GB)

( * ) Notice: Subject to any disclaimer, the term of this patent is extended or adjusted under 35 U.S.C. 154(b) by 0 days.

(21) Appl. No.: 09/397,544

(22) Filed: Sep. 16, 1999

(30) Foreign Application Priority Data

Sep. 17, 1998 (GB) .............................................. 9820141

(51) Int. Cl.$^7$ .............................................. H02H 3/18
(52) U.S. Cl. ...................................................... 361/80
(58) Field of Search ............................. 361/66, 69, 80, 361/81, 115

(56) References Cited

U.S. PATENT DOCUMENTS

| | | | | |
|---|---|---|---|---|
| 4,484,245 A | * | 11/1984 | McFall | 361/68 |
| 4,528,611 A | * | 7/1985 | Udren | 361/81 |
| 4,674,002 A | * | 6/1987 | Li et al. | 361/66 |
| 4,725,914 A | * | 2/1988 | Garitty | 361/76 |
| 4,896,241 A | * | 1/1990 | Li et al. | 361/66 |
| 5,838,525 A | * | 11/1998 | Ward et al. | 361/69 |

FOREIGN PATENT DOCUMENTS

| | | | | |
|---|---|---|---|---|
| GB | 1090862 | 11/1967 | ............ | H02H/7/26 |
| GB | 1 280 739 | 7/1972 | ............ | H02H/3/40 |
| GB | 2 212 998 A | 8/1989 | ............ | G01R/31/08 |

OTHER PUBLICATIONS

Alstom, Service Manual R5943D, vol. 1, Chapter 2, pp. 16–17 and 24–27, 1996, No month.

* cited by examiner

*Primary Examiner*—Ronald W. Leja
(74) *Attorney, Agent, or Firm*—Kirschstein, et al.

(57) ABSTRACT

A method of protecting a section of a line is disclosed. The method comprises providing a local fault protection assembly at one end of the section distal from at least one remote fault protection assembly at the other side of the section, each assembly comprising a circuit breaker, a line signal measurement assembly adapted to produce an output signal indicative of the voltage or current on the line, and a signal processing assembly adapted to process the output signal to produce a fault signal in the event that the output signal indicates the presence of a fault in the line, the method comprising the steps of monitoring the output signal from the signal measurement apparatus at the local circuit breaker to detect the presence of a fault within a first zone extending over at least a part of the section from the local breaker or outside of this first zone, and in the event that the output signal is indicative of a fault within the first zone substantially instantly opening the local circuit breaker, and in the event that the fault is outside the first zone detecting the operation of the remote circuit breaker by monitoring the output signal from the local signal measurement apparatus, monitoring the output signal to determine the condition of the section of line after the remote circuit breaker has been operated, and operating the local circuit breaker in the event that the fault condition meets a predetermined criteria.

16 Claims, 9 Drawing Sheets

FAULT PROTECTION SCHEME

BACKGROUND OF THE INVENTION

This invention relates to improvements in apparatus for the protection of electrical power lines.

Several fault protection techniques are known for power lines (including electrical cables). They each have several common features and yet can be divided into at least two distinct groups.

In a general fault protection scheme, a fault protection circuit which includes a circuit breaker is provided in the electrical line. The breaker has a normally closed contact which connects two portions of the line when no fault is present. When a fault is detected, the contact is opened to isolate one part of the line from the other. A trip relay is provided which detects the current or voltage flowing in the line to provide an output signal. If the output signal is indicative of a fault on the line, the circuit breaker is opened. The exact construction of this fundamental building block of fault protection systems and its variants is well known and will not be described further herein.

The known fault protection schemes differ in the way in which the output signal is processed to control the opening of the circuit breaker. Two broad categories of scheme are known as non-unit protection and unit protection. Each has its own limitations.

An example of a non-unit fault protection scheme is the distance protection scheme. In this scheme a single circuit breaker protects a length of line section, for example over the ends 'S' and 'R' as shown in FIG. 1(a).

A single measurement device (the "relay") provided at a measurement point "M1" adjacent the circuit breaker provides an output signal indicative of the signal on the line. From the single measurement, the protected portion of line covered by the circuit breaker is divided into a number of zones, typically two zones. The first zone, zone 1, may cover up to 80% of the line section from the circuit breaker. This is referred to as the reach point and is shown in FIG. 1(a). Zone 2 is normally arranged to cover 50% of the shortest adjacent line beyond the protected line. Again this is shown in FIG. 1(a). Since the impendance of a line is proportional to its length, the zone 1 can be defined using a relay capsule of measuring the impedance of the line up to a certain point. This is known in the art as a distance relay. It is designed to operate its circuit breaker only for faults occurring between the relay location and its reach point.

For a fault occurring within zone 1, say at a point 'F1' the fault can be detected by monitoring the output signal from the relay. The circuit breaker is adapted to be opened instantly upon detecting the presence of a fault in zone 1.

For a fault occurring within zone 2 and outside zone 1, say at a point 'F2', the overall response time of the circuit breaker is chosen to be significantly longer. This provides enough time for an adjacent (remote) circuit breaker on the line nearer to the zone 2 fault to open, hopefully clearing the fault without the need to open the local circuit breaker. In the example, if the second circuit breaker employs a two zone protection scheme, F2 will be within its zone 1 area causing an instant trip.

A problem with the non-unit protection technique described above is that the boundaries of the zones are not well defined, especially zone 2.

Unit protection techniques, on the other hand, have a clear defined protection zone as shown in FIG. 1(b). The boundaries are user defined by using information from the local relay and also from a remote relay at the other end of the protected section of line. The system effectively makes two point measurements at points "M1" and M2", i.e. from each end of the protected section.

A communication link is used to transmit information about the system condition from one end of the protected section to the other. With this connection, the relays at both ends can be arranged to trip instantly to isolate the protected portion of the line when a fault occurs on the protected portion, say at "F1". For a fault outside of the protected portion, the circuit breakers may both be prevented from opening, for instance for a fault at the point "F2".

Whilst the unit protection scheme provides more defined zones than the non-unit protection scheme by allowing accurate location of the fault position, it is expensive to implement and the communication links are undesirable.

In a modification of the two schemes, it is known to combine the distance protection with the communication links in what is known as a "permissive undereach scheme". In this scheme, shown schematically in FIG. 1(c), a protection relay is provided at each end of a protected portion of a line. Each relay is adapted to make an instant fault trip of its associated circuit breaker for a fault occurring within a zone 1 distance along the line. This zone 1 typically defines 80% of the line section length. For example, for a fault at position "F1" in the Figure, both circuit breakers will be opened instantly. However, for a fault occurring outside of zone 1 at one relay, only one circuit breaker will be instantly tripped. A signal passed along a communical link between the two relays can be used to send information from the relay that has instantly tripped to the other relay. Only if an appropriate signal is received will the other circuit breaker be opened as the fault lies outside its protected zone 1 section. Again, this scheme suffers from the need for a communication link between the relays.

SUMMARY OF THE INVENTION

An object of the invention is to provide a fault protection scheme which at least partially alleviates the problems present in prior art systems incorporating communication links.

In accordance with a first aspect of our invention a section of a line is protected by providing a local fault protection assembly at one end of the section distal from at least one remote fault protection assembly at the other side of the section, each assembly comprising a circuit breaker, a line signal measurement means adapted to produce an output signal indicative of the voltage or current on the line, and a signal processing means adapted to process the output signal to produce a fault signal in the event that the output signal indicates the presence of a fault in the line, the method comprising the steps of monitoring the output signal from the signal measurement means at the local circuit breaker to detect the presence of a fault within a first zone extending over at least a part of the section from the local breaker or outside of this first zone, and in the event that the output signal is indicative of a fault within the first zone substantially instantly opening the local circuit breaker, and in the event that the fault is outside the first zone detecting the operation of the remote circuit breaker by monitoring the output signal from the local signal measurement means, monitoring the output signal to determine the condition of the section of line after the remote circuit breaker has been operated, and operating the local circuit breaker in the event that the fault condition meets a predetermined criteria.

By a part of the protected section, we mean 50% or 60% of the length of the section. It may be more than this, say 90%, or less, say 10%.

The invention therefore provides a method in which unit protection is implemented without the need for a remote communication link between the local and remote circuit breaker. This is made possible by suitable processing of the output signal.

By operation of the remote circuit breaker we may mean opening or closing of a trip contact of the remote circuit breaker provided in the line. By operating the local circuit breaker, we mean opening or closing the circuit breaker.

The method may comprise the additional step of substantially instantly opening the local circuit breaker regardless of whether a fault is detected which is within the first zone or outside the first zone. If the output signal from the signal measurement means indicates that the fault has not been cleared after the operation of the remote circuit breaker has been detected, the local circuit breaker may be inhibited from reclosing. If the fault is cleared, the local circuit breaker may be reclosed. This is known as the "instant operation mode".

An advantage of the instant operation mode is that it offers increased protection by automatically opening the local circuit breaker to isolate the line section for any detected fault condition. The detection of the operation of the remote breaker combined with the detection of the fault condition after it (the remote breaker) has operated, allows rapid clearing of the fault.

In an alternative, if a fault is detected by monitoring the output signal which is not within the first zone, the circuit breaker cannot be opened instantly. Instead it may be opened after a predetermined time delay. In the event that the operation of the remote circuit breaker is detected by monitoring the output signal and indicates that the fault on the line persists after this operation, the local circuit breaker may be opened at an accelerated time without waiting for the predetermined delay. If the fault has cleared then the local circuit breaker may be inhibited from opening at all. This is known as the "delayed operation mode". Operation in either the instant or delayed mode may be selected during installation of the apparatus.

In a yet further modification, the fault protection may be adapted to choose either instant operation or delayed operation adaptively in response to the type of fault which occurs.

It will be therefore be understood that the invention lies, at least in part, in monitoring the output signal from a single measurement sensor at a local circuit breaker to determine the effect of the operation of a remote circuit breaker on the fault signal present on the line to decide how to operate the local circuit breaker.

The remote fault protection assembly may also be adapted to operate in the same way as the local fault protection assembly described hereinbefore. Thus, any circuit breaker on the line may operate as a "local" breaker, with adjacent breakers on the line being "remote" breakers.

The operation of the remote circuit breaker may be detected by monitoring the output signal over time to detect changes in value indicative of opening of a remote breaker. A knowledge of the time delay between detecting a fault and the expected closure or opening of adjacent remote breaks can be used to help identify the remote operation.

The output signal may comprise three output sub-signals, one sub-signal per phase for a three phase line. Any such three phase system may be represented as the sum of three balanced three-phase components; positive sequence having the same phase rotation as the original system, negative sequence having the opposite phase rotation, and zero sequence having no phase rotation. In the event of an unbalanced or asymmetrical fault, negative and zero sequence quantities will be generated. These components can be observed in the output sub-signals and used to identify an initial fault.

Operation of a remote breaker can be detected by looking for changes in the sub-signals after the initial fault has been detected.

On a three-phase line, a fault on the line may be detected by looking for an output signal indicative of an unbalanced current or voltage. A system is unbalanced when three phase currents and/or voltage signals are not of equal amplitude and/or the phase differences between successive signals are unequal. It is expected that most fault conditions will provide unbalanced or transient signals. The line signal will normally be balanced in a no fault operating condition.

By line signal we mean the current or voltage on the line. This may typically be a sinusoidal three phase voltage or current signal.

In the event of a balanced three phase to earth fault, only a positive sequence component will be produced in the output sub-signals. This can be used to detect the presence of such a fault condition. A change in this positive sequence quantity can be used to detect the operation of a remote breaker operation.

The positive and/or negative and/or zero sequence components may be detected using a real-time processing algorithm.

One or more ratio signals may be calculated from the RMS values of the sequence components. A first ratio may be used to indicate an asymmetrical fault. The second ratio may be used to identify a three phase symmetrical fault.

The first zone may be defined by known distance protection techniques. It may cover approximately 80% of the length of the protected portion of line.

The output sub-signals may be indicative of the voltage or the current in the phases of the line.

The current sensing devices may comprise relays such as electromechanical relays or static relays and may be combined with digital or analogue electronic processing means.

According to a further aspect, the invention provides apparatus for protecting a section of a line comprising a local fault protection assembly provided at one end of the section distal from at least one remote fault protection assembly provided at the other side of the section, each assembly comprising a circuit breaker, a line signal measurement means adapted to produce an output signal indicative of the voltage or current on the line, and a signal processing means adapted to process the output signal to produce a fault signal in the event that the output signal indicates the presence of a fault in the line, in which the apparatus includes means for monitoring the output signal from the signal measurement means at the local circuit breaker to detect the presence of a fault within a first zone extending over at least a part of the section from the local breaker or outside of this first zone, and means for controlling the circuit breaker so that in the event that the output signal is indicative of a fault within the first zone the controlling means is adapted to substantially instantly open the local circuit breaker, and in the event that the fault is outside the first zone the monitoring means is adapted to detect the operation of the remote circuit breaker by monitoring the output signal from the local signal measurement means, and the monitoring means is further adapted to monitor the output signal to determine the condition of the section of line after the remote circuit breaker has been operated, the control means being adapted to operate the local circuit breaker in the event that the fault condition meets a predetermined criteria.

The further optional and preferred feature of the apparatus can be determined from the description of the method hereinbefore.

BRIEF DESCRIPTION OF THE DRAWINGS

There will now be described, by way of example only, one embodiment of the present invention with reference to the accompanying drawings of which:

In FIGS. 1(a), 1(b) and 1(c), CB represents circuit breaker. In the FIGS. 3(1) to 10(1), $I_a$, $I_b$ and $I_c$ represent the three phase currents; In the FIGS. 3(2) to 10(2), $I_1$, $I_0$ and $I_2$ represent the positive, zero and negative sequence currents; In the FIGS. 11(1) to 14(1), $V_a$, $V_b$ and $V_c$ represent the three phase voltages; In the FIGS. 11(2) to 14(2), $V_1$, $V_0$ and $V_2$ represent the positive, zero and negative sequence voltages; In the FIGS. 9(3) and 10(3), $R_1$, and $R_2$ represent the ratio signals as given in the Equation (11) and (12) respectively; The derivation of the sequence quantities and the ratio signals will be given in the equations (1)–(12) hereinafter.

DETAILED DESCRIPTION OF PREFERRED EMBODIMENTS

The present invention covers protected zone with clearly defined boundary using one point measurement only. In another word, it can be considered to be a unit protection apparatus without the need for any communication link.

Figure 2:
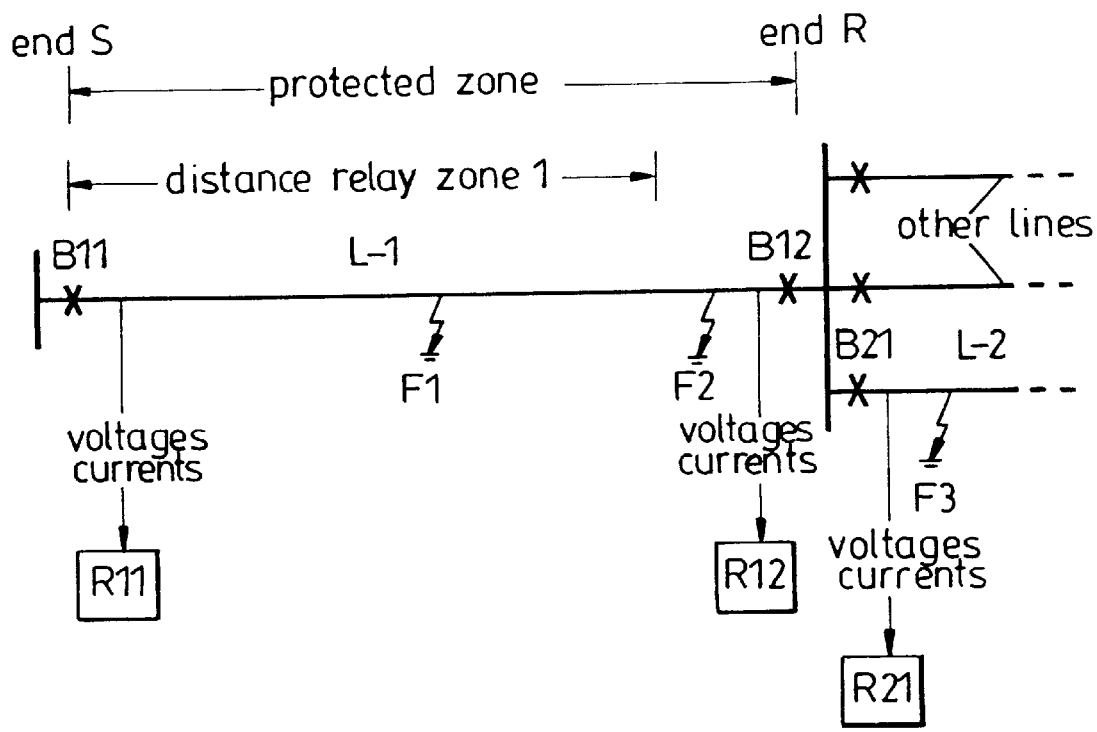
FIG. 2 is an equivalent circuit of a multi-section power line system used to demonstrate the invention.

FIG. 2 is used as an example to describe the invention. As shown, this is a multi-section power line system with the circuit breaker means R11 and R12 installed at each end (ends 'S' and 'R') of the protected line section L-1. B11 and B12 are three phase circuit breakers used to protect line section L-1. R21 and B21 are protection apparatus and three phase circuit breaker responsible for the protection of line section L-2 at the end 'R'. In the examples given below, the present invention is incorporated into the apparatus of the invention R11, the protection zone of the apparatus covers the line section L-1 which is the line section between the end 'S' and 'R'. The fault detection of R11 covers both Zone 1 and Zone 2 from the end 'S'. The performance of the apparatus is demonstrated by its responses to different fault conditions, in particular to the faults outside Zone 1 reach of the R11 on the protected line (for example, at the 'F2' point on line section L1) and faults outside the protection zone within the Zone 2 reach of the R11 (fro example, at the 'F3' point on line section L-2).

There are two possible operation modes of the apparatus shown in FIG. 2. These are the delayed operation mode and the instant operation mode. Here the word 'operation' means to open or close circuit breaker(s), which could be one of the three phase circuit breaker (the single phase tripping or closing) or the three phase circuit breaker concurrently (the three phase tripping or closing). In the case that the three phase circuit breakers open concurrently, each of the three phase breakers will normally open independently upon the current which flows through the individual circuit breaker cross zero value. As a result, there could be a time delay between the opening of each phase circuit breaker. However, the delay is very short (normally within a few mili-second), it has no effect on the invention presented here and will not be demonstrated in the following examples.

Figure 1A:
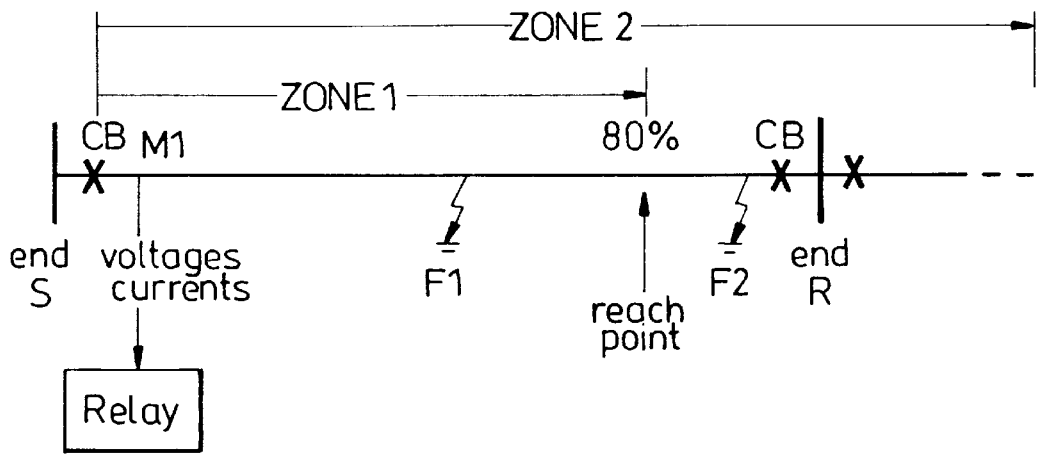
FIG. 1(a) is an equivalent circuit for a typical known distance protection scheme.
Figure 1B:
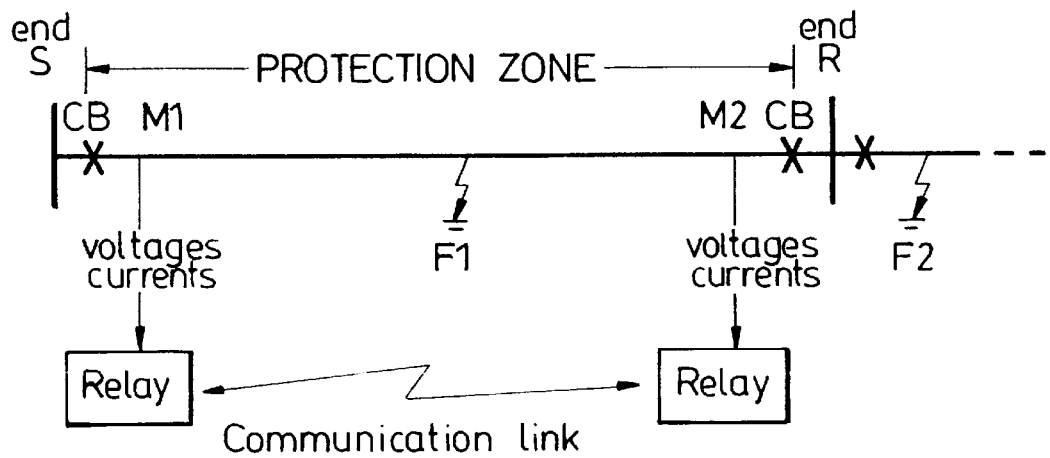
FIG. 1(b) is an equivalent circuit for a typical known unit-protection scheme.
Figure 1C:
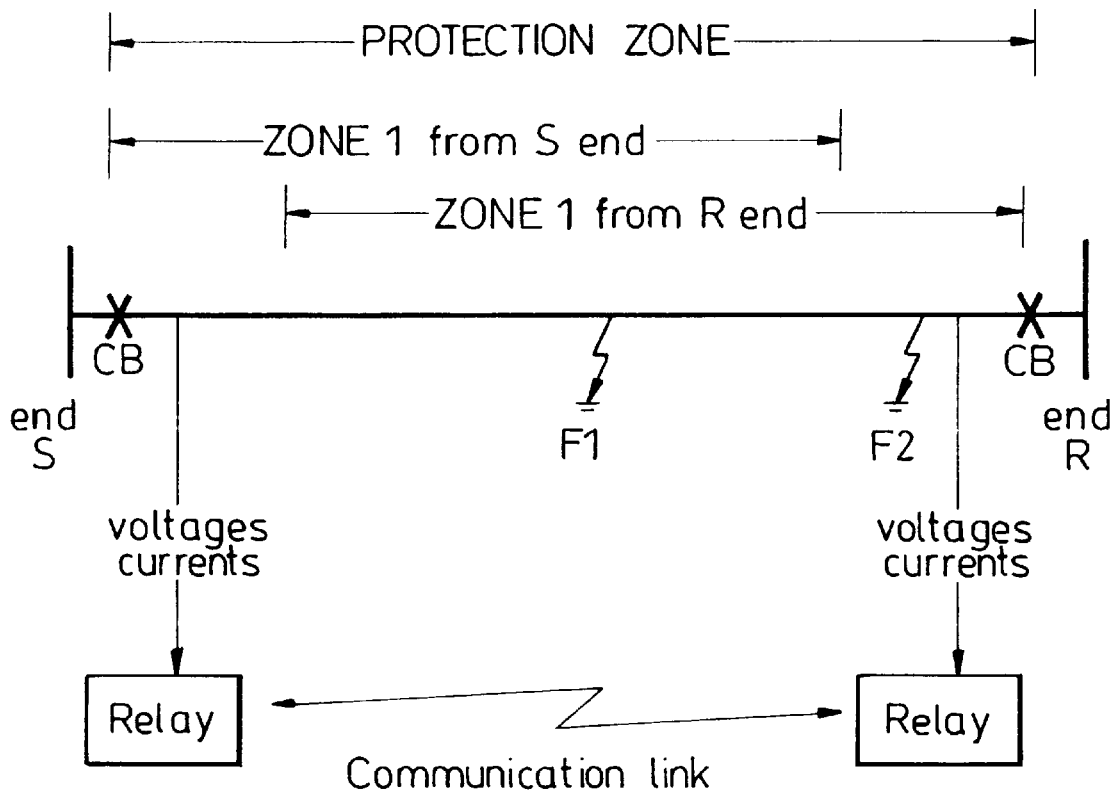
FIG. 1(c) is an equivalent circuit for a typical known distance protection scheme with communication link.

The fault protection apparatus uses a distance technique (as shown in FIG. 1(*a*)) as the means for fault detection and protection. The basic principle of the distance protection technique is well-known. In the invention, the apparatus makes decision as whether to instantly or delayed operate the associated circuit breaker(s) depending on the system and fault condition. This is made by monitoring the output of the sensing means associated with each circuit breaker to detect the operation of a "remote breaker".

With reference to FIG. 2, for a fault occurring on section L-1 within the protection Zone 1 of both apparatus R11 and R12, for example at the point 'F1', R11 and R12 will operate to trip the line section L-1 instantly. However, for a fault occurring close to one end of line inside (for example, at the point 'F2' on line section L-1) or outside (for example, at the point 'F3' on line section L-2) of the protection zone of R11 within the Zone 2 reach of the apparatus, the R12 or R21 which close to the fault point will quickly detect the fault and trip corresponding circuit breakers B12 (if fault is on line L-1) or B21 (if fault is on line L-2) instantly. The R11 at the end 'S' will first assess the severity of the fault impact on the power line system to decide to which operation mode to be used in this fault condition. That is whether to instantly or delayed trip the associated circuit breakers B11. A criterion for the severity of a fault with respect to the levels of the faulted voltage and current signals can be derived and set in advance. If the preset criterion is met, R11 should enter the instant operation mode. Otherwise, the delayed operation mode will be adopted. Depending on the system and fault condition, the apparatus can also be set to operate under instant or delayed operation mode alone.

In the instant operation mode, the apparatus R11 will instantly trip its associated circuit breakers B11 for a fault detected within Zone 2 reach of R11. After opening the associated circuit breakers B11, the apparatus R11 will start to detect whether the fault is inside the protected zone or not by identifying the operation performed by the remote circuit breaker(s). An in zone fault can be assumed if the circuit breakers B12 on the protected line at the end 'R' opens and the fault condition is still persistence after the operation. This effectively means that the remote relay R12 detects an in zone fault and trips the faulted section L-1. In this situation, the R11 is inhibited from immediate reclosing operation. Otherwise, the R11 will issue a reclosing command and close its associated circuit breaker B11 when an out zone operation by the remote circuit breaker (for example, the B21) is detected and the fault is isolated from the protected line section L-1.

Since the fault is beyond the Zone 1 reach of the apparatus R11, therefore the impact to the system is comparatively light and it is very likely the R11 will enter the delayed operation mode. In this mode, the R11 will wait while detecting the breaker operation at the end 'R'. The apparatuses at the end 'R' on different line sections can easily mace decision due to the fault is very close to their locations and trip the corresponding faulted section. The R11 at the end 'S' will then detect and identify whether the circuit breaker B12 on the section L1 at the remote end have tripped or not. Again, the tripping of the breaker B12 means that the fault is inside of the protected zone or on the remote busbar associated to the protected line section L-1. In both cases, the R11 will issue a tripping command to isolate the protected line section L-1. Otherwise, R11 will give no response if the remote circuit breaker outside the protected line (for example, the B21) operates to isolate the fault from line section L-1.

It is expected, the three phase currents and voltages will be in an unbalanced or transient operating condition for a fault existing on the line and will resume balanced and stable operating condition if the fault is cleared by the opening of circuit breaker(s) to isolate the faulted section(s). It is well-know that most faults are asymmetrical and therefore generated negative and zero sequence quantities. The apparatus relies on the detection of the presence of the negative and zero sequence quantities to decide whether a system is in a balanced or unsymmetrical faulted condition and the operation performed by the remote breaker. For symmetrical faults, such as three phase and three phase to earth faults, although there is no presence of the negative and zero sequence quantities, there will be a significant change in the level of the positive sequence quantity, which is utilised to identify the system operation condition and the operation performed by the remote breaker.

In an alternative arrangement, the fault protection apparatus may be configured to operate in a combined operation mode, in which it can operate in both modes adaptively. Which operating mode is employed will depend on the type of fault which has occurred. For example, it may operate a delayed mode for a single or two phase fault when three phase operation is adopted, yet instant mode when a three phase fault or single phase fault occurs when single phase breaker operation is adopted.

In the present invention, the positive, negative and zero sequence quantities are first derived through a real-time processing algorithm. The Root-Mean-Square (known as RMS) values of these sequence quantities are then computed and the levels of which are compared and used to determine the system condition. In particular, the changes in these quantities are used to identify the operation of remote circuit breaker(s).

The positive, negative and zero sequence quantities can be expressed as follow:

$$S_1 = (S_A + a S_B + a^2 S_C)/3$$

$$S_2 = (S_A + a^2 S_B + a S_C)/3$$

$$S_0 = (S_A + S_B + S_C)/3 \quad (1)$$

Where $S_A$, $S_B$ and $S_C$ are three phase power frequency voltages or currents;

$S_1$, $S_2$ and $S_0$ are positive, negative and zero sequence quantities.

Equ. (1) can be expressed as (2) when time interval $\Delta T = T/3$ $$S_1 = \left(S_A + S_B e^{-j\frac{2T}{3}} + S_C e^{-j\frac{T}{3}}\right)/3 \quad (2)$$

$$S_2 = \left(S_A + S_B e^{-j\frac{T}{3}} + S_C e^{-j\frac{2T}{3}}\right)/3$$

$$S_0 = (S_A + S_B + S_C)/3$$

where T is the period for power frequency, which can be either 50 or 60 Hz.

When Equation (2) is expressed in time domain:

$$3S_1(t) = S_A(t) + S_B(t-2T/3) + S_C(t-T/3)$$

$$3S_2(t) = S_A(t) + S_B(t-T/3) + S_C(t-2T/3)$$

$$3S_0(t) = S_A(t) + S_B(t) + S_C(t) \quad (3)$$

if a digital sampling rate of $\omega T_s = 30°$ is used, the discrete form of (3) is given as:

$$3s_1(k) = s_A(k) + s_B(k-8) + s_C(k-4)$$

$$3s_2(k) = s_A(k) + s_B(k-4) + s_C(k-8)$$

$$3s_0(k) = s_A(k) + s_B(k) + s_C(k) \quad (4)$$

As shown, 8 past samples are required for the computation of the positive and negative sequence quantities by using (4), the time delay is unacceptable for the application here.

The way to speed up calculation is to reduce the required samples, that is to reduce the power of the 'e' in equation (2). The mathematical relationship of Equation (5) can be utilised:

$$e^{\pm ja} = 2\cos\left(\frac{a}{2}\right)e^{\pm j\frac{a}{2}} - 1 \quad (5)$$

By using (5), Equation (6) can be derived as follow:

$$e^{\pm j120°} = e^{\pm j60°} - 1 = \sqrt{3} e^{\pm j30°} - 2$$

$$e^{\pm j240°} = -e^{\pm j120°} - 1 = -e^{\pm j60°} = -\sqrt{3} e^{\pm j30°} + 1 \quad (6)$$

using Equation (6) in (2), the following equation is derived $$S_1 = (S_A - \sqrt{3} S_B e^{-j30°} + S_B + \sqrt{3} S_C e^{-j30°} - 2S_C)/3$$

$$S_2 = (S_A + \sqrt{3} S_B e^{-j30°} - 2S_B - \sqrt{3} S_C e^{-j30°} + S_C)/3$$

$$S_0 = (S_A + S_B + S_C)/3 \quad (7)$$

express Equation (7) in time domain:

$$3S_1(t) = S_A(t) - 2S_C(t) + S_B(t) + \sqrt{3}[S_C(t-T/12) - S_B(t-T/12)]$$

$$3S_2(t) = S_A(t) - 2S_B(t) + S_C(t) + \sqrt{3}[S_B(t-T/12) - S_C(t-T/12)]$$

$$3S_0(t) = S_A(t) + S_B(t) + S_C(t) \quad (8)$$

using the same sampling rate $\omega T_s = 30°$ as in (4), Equation (9) is obtained:

$$3S_1(k) = S_A(k) - 2S_C(k) + S_B(k) + \sqrt{3}[S_C(k-1) - S_B(k-1)]$$

$$3S_2(k) = S_A(k) - 2S_B(k) + S_C(k) + \sqrt{3}[S_B(k-1) - S_C(k-1)]$$

$$3S_0(k) = S_A(k) + S_B(k) + S_C(k) \quad (9)$$

Equ. (9) only requires one sample delay to compute the positive and negative sequence quantities, therefore significantly increase the speed of the computation.

The RMS values of the discrete sequence quantities can be derived using equation (10):

$$\overline{S}_x(k) = \sqrt{\frac{1}{2}\left[s_x^2(k) + \left(\frac{s'_x(k)}{\omega}\right)^2\right]} \quad (10)$$

where $s_x(k)$, $\overline{S}_x(k)$ represent discrete and RMS values of the positive, negative and zero sequence quantities respectively for x=1, 2, 0

Two ratio signals are used to detect whether a system is in a balanced operation or not. Firstly, the change in the zero and negative sequence quantities with respect to the change of the positive sequence quantity is used as the main criterion to detect whether the system is in a balanced operation condition or not. A ratio signal is given in equation (11):

$$R_1(k) = \frac{\overline{S}_2(k) + \overline{S}_0(k)}{\overline{S}_1(k)} \quad (11)$$

To cover some special fault condition, such as three phase and three phase to earth faults, an additional criterion is also used to represent the changing of the positive sequence quantity during fault period, which is given as:

$$R_2(k) = \frac{\overline{S}_1(k) - \overline{S}_{1pre}}{\overline{S}_{1pre}} \quad (12)$$

where $\overline{S}_{1pre}$ is the RMS value of the pre-fault positive sequence quantity The signal $R_1$ will be of zero value under no fault or symmetrical fault condition since there is no presence of negative and zero sequence quantities, and will be increased to a level well above zero if an unsymmetrical fault present on the system. Under the symmetrical fault condition, the signal $R_2$ will increase to a level and return to zero after the clearance of the fault from the system. The theoretical values for the signal $R_1$ will be '1' for phase to phase fault and '2' for phase to earth fault with remote circuit breaker open. The level of signal $R_2$ will be well above '1' deepening on the pre- and post fault system condition. As a result, a preset threshold above zero level (say between 0.2 and 0.4) can be used to determine the system fault condition by examining whether the one of the two ratio signals $R_1$ and $R_2$ has exceeded it or not.

There will now be examples demonstrating the performance of the apparatus under delayed operation mode using current measurements.

Case 1 Single Phase to Earth Fault with Three-phase Breaker Operation

Figure 3:
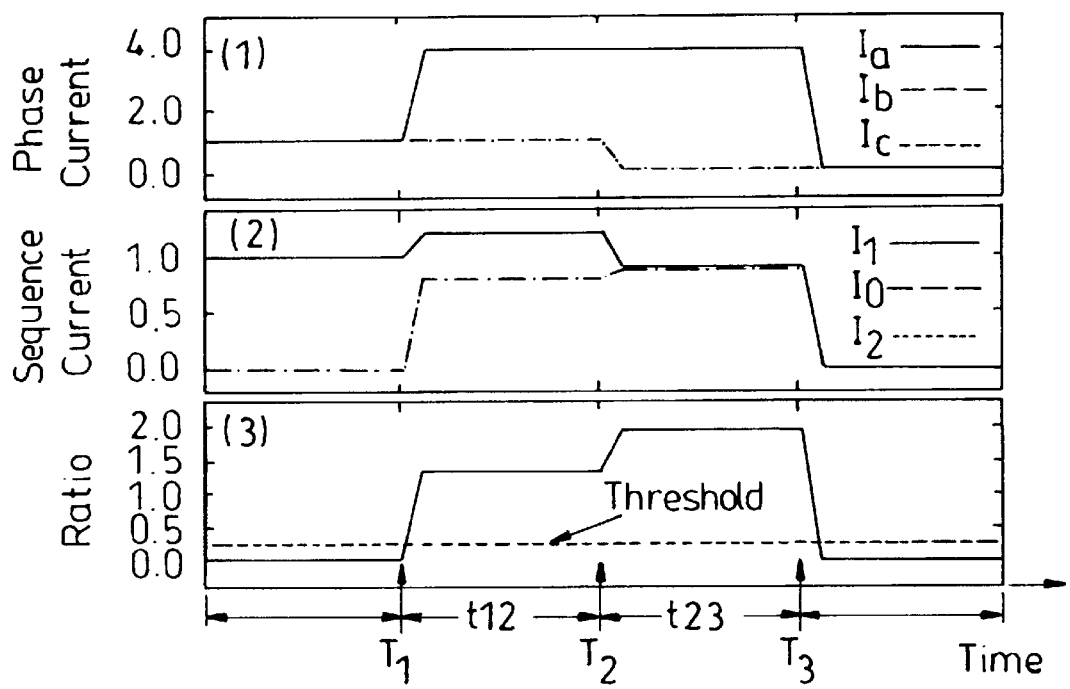
FIGS. 3(1), 3(2) and 3(3) are graphs showing the RMS values of the phase, sequence current signals and the ratio signal for a single phase to earth fault inside the protection zone; the three phase operation of the circuit breakers and delayed operation mode of the present invention are adopted; where $T_1$ is the time of fault inception; $T_2$ is the time when the three phase circuit breaker B12 opens; $T_3$ the time when the three phase circuit breaker B11 opens.

FIG. 3 shows the responses of the apparatus for a typical in zone single phase to earth fault ('a'–'e') near busbar 'R' on the line section L-1 during the periods of pre-fault, post fault with breaker operations. 3(1) shows the level of three phase current signals, 3(2) shows the sequence current signals, 3(3) shows the ratio signal $R_1$ as given in Equation (11).

As shown in the figure, during the normal balanced operation before the fault inception, the three phase current signals are of the same level and the zero and negative sequence currents remain as zero. There is a significant increase in the faulted phase current ($I_a$) and consequently both the negative ($I_2$) and zero ($I_0$) sequence currents after the fault inception at time $T_1$. The apparatus R12 on line section L-1 at the end 'R' detects the fault, issues a tripping command and subsequently opens the associated circuit breaker B12.

The ratio signal $R_1$ increases to a level above the preset threshold after the fault inception at time $T_1$ as shown in FIG. 3(3). After the opening of the remote end circuit breaker B12 at time $T_2$, the phase 'b' and 'c' of line section L-1 become open circuit and $I_b$ and $I_c$ drop to zero values. However, the fault on phase 'a' has not been cleared by the remote circuit breaker operation since it is inside the protected zone. The faulted phase current $I_a$ and the negative, zero sequence current remain at high level. The consequence is that the ratio is kept well above the threshold, which enables the apparatus R11 at the end 'S' detects this in zone fault condition, and consequently issues a tripping command and subsequently circuit breaker B11 opens to isolate the faulted line section L-1 at time $T_3$.

As shown in the FIG. 3, the time delay from the fault inception at time $T_1$ to the opening of the circuit breaker B11 at time $T_3$ mainly consists of 2 time periods, the t12 and t23. t12 consists of the time period from the fault inception to the operation of the end 'R' circuit breaker B12 which is the time taken by the R12 to detect the presence of a fault (normally takes about one power frequency cycle) and the time taken for circuit breaker B12 to open (normally takes between one to three cycles depending on the circuit breaker used). t23 consists of the time taken for the apparatus R11 to identify the operation of breaker B12 plus the response time of the circuit breaker B11. In the case of no delayed operation, the time taken from fault inception to the opening of breaker B11 at the end 'S' will be the same as the time period t12. Therefore, the total time delay for delayed operation mode will be the time period of t23, which is approximately 2 to 4 cycles depending on the circuit breaker used.

Figure 4:
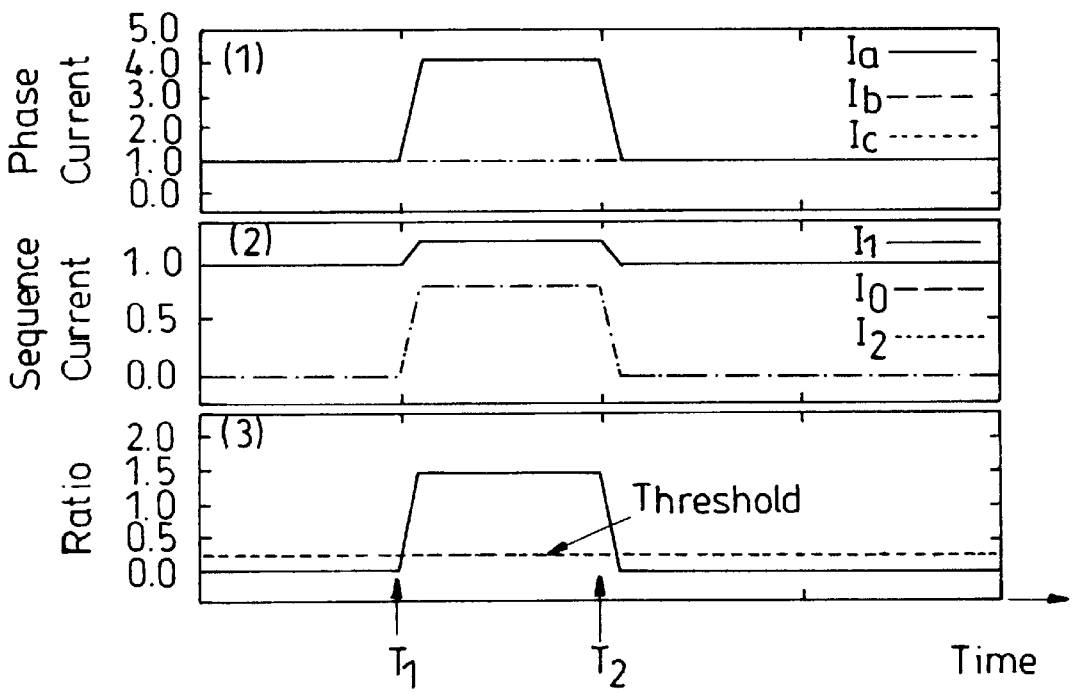
FIGS. 4(1), 4(2) and 4(3) are graphs showing the RMS values of the phase, sequence current signals and the ratio signal for a single phase to earth fault outside the protection zone; the three phase operation of the circuit breakers and delayed operation mode of the present invention are adopted; where $T_1$ is the time of fault inception; $T_2$ is the time when the three phase circuit breaker B12 opens.

FIG. 4 shows the corresponding responses for an out zone single phase to earth fault occurring near busbar 'R' on line section L-2. Since the fault is close to the previous fault location, the phase and sequence current signals as shown in FIG. 4(1) and 4(2) are about the same level as shown in FIG. 3(1) and 3(2) before the opening of the end 'R' breaker B21 at time $T_1$. After the opening of the circuit breaker B21 at time $T_2$, the fault is isolated from the protected section L-1, and the system resumes balanced operation. Consequently, the faulted phase current $I_a$ returns back to pre-fault level and the negative, zero sequence currents drop back to zero as shown in FIG. 4(2). The signal ratio then drops to a level well below the threshold as shown in FIG. 4(3), which inhibits the apparatus R11 at the end 'S' from making a tripping decision for this out zone fault condition.

Case 2 Phase to Phase Fault with Three-Phase Breaker Operation

Figure 5:
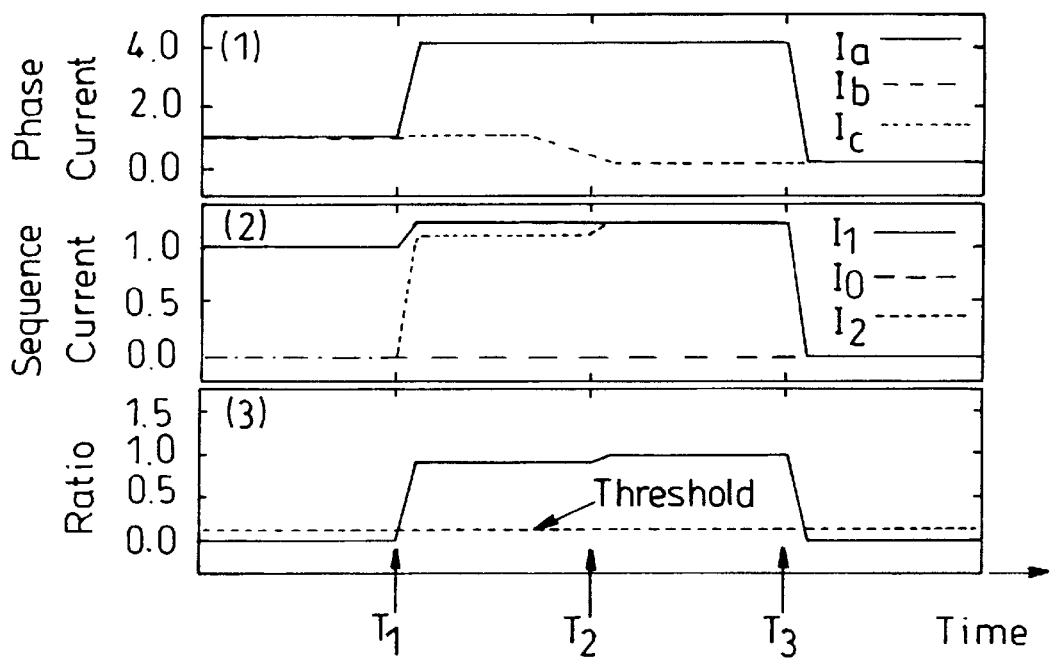
FIGS. 5(1), 5(2) and 5(3) are graphs showing the RMS values of the phase, sequence current signals and the ratio signal for a phase to phase fault inside the protection zone; the three phase operation of the circuit breakers and delayed operation mode of the present invention are adopted; where $T_1$ is the time of fault inception; $T_2$ is the time when the three phase circuit breaker B12 opens; $T_3$ the time when the three phase circuit breaker B11 opens.

FIG. 5 shows the responses for a phase to phase ('a'–'b') in zone fault close to busbar 'R' on line section L-1. As shown in FIG. 5(2), the system enters an unbalanced operation condition after the fault inception at time $T_1$. As expected, the zero sequence current is kept at zero because the fault does not involve earth. The opening of the circuit breaker B12 at time $T_2$ dose not clear the fault on line section L-1, the significant negative sequence current present keeps the signal ratio well about the preset threshold as shown in FIG. 5(3). At the same time, the unfaulted phase current $I_a$ drops to zero due to the opening of the circuit breaker B12. As a result, the apparatus R11 detects this in zone fault condition and issues a tripping command and subsequently opens the circuit breaker B11 at time $T_3$, the faulted section L-1 is isolated.

Figure 6:
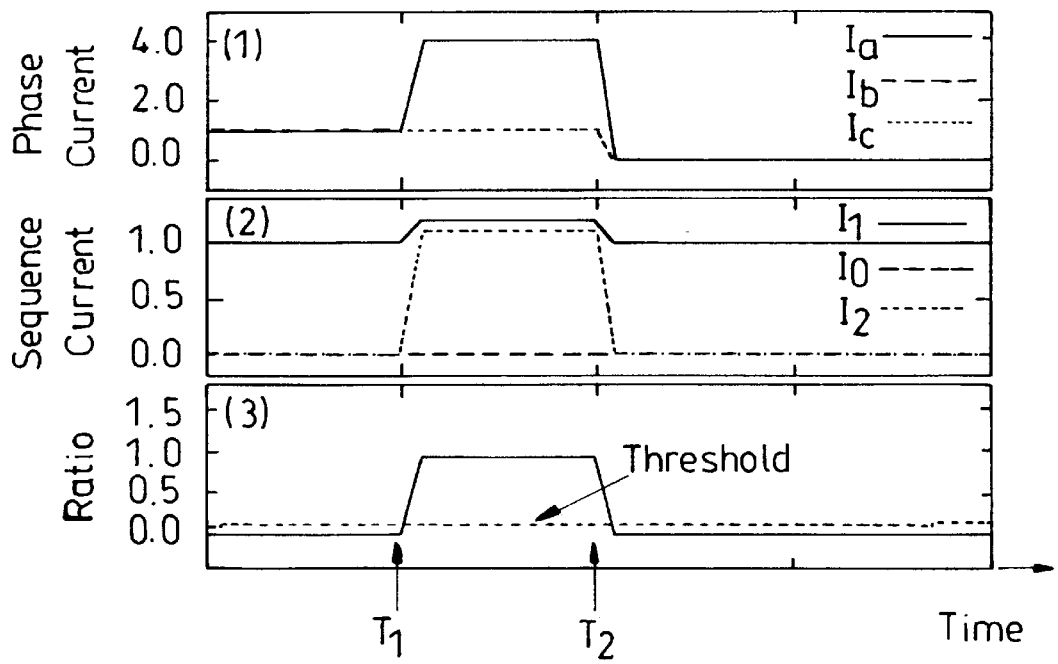
FIGS. 6(1), 6(2) and 6(3) are graphs showing the RMS values of the phase, sequence current signals and the ratio signal for a phase to phase fault outside the protection zone; the three phase operation of the circuit breakers and delayed operation mode of the present invention are adopted; where $T_1$ is the time of fault inception; $T_2$ is the time when the three phase circuit breaker B12 opens.

On the contrast, for the out zone phase to phase fault condition as shown in FIG. 6, the fault is isolated from the section L-1 after the opening of circuit breaker B21 at time $T_2$, the fault associated negative sequence current drops to zero. The system then returns to a balanced operation condition. As shown in FIG. 6(3), the signal ratio drops to zero which inhibits the apparatus R11 at the end 'S' from making a tripping decision.

Case 3 High Impedance Faults Condition With Single-phase Breaker Operation

Figure 7:
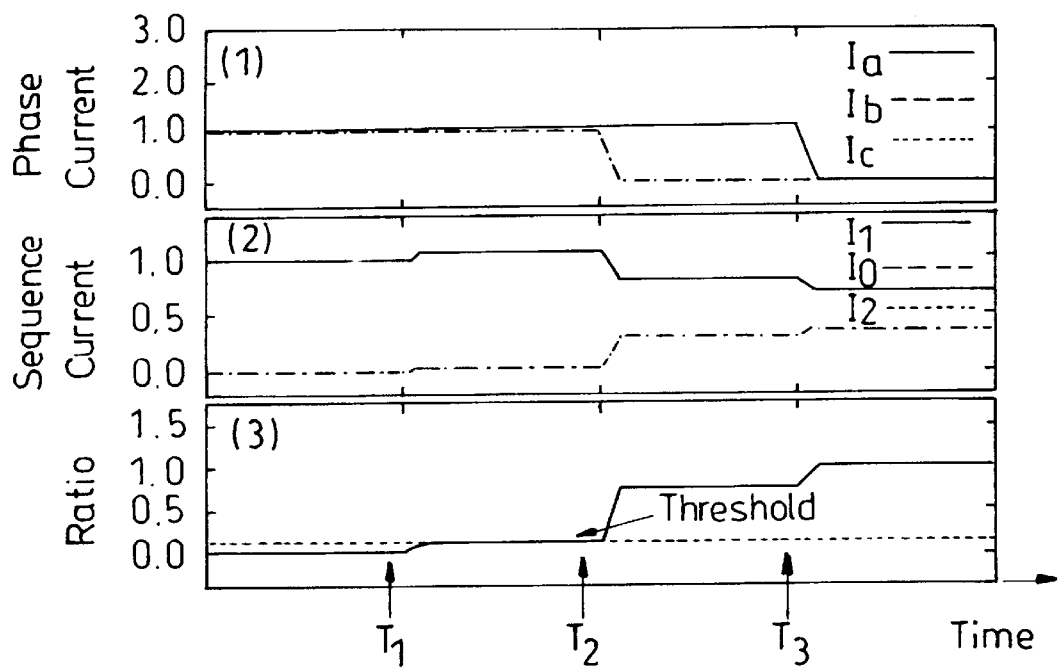
FIGS. 7(1), 7(2) and 7(3) are graphs showing the RMS values of the phase, sequence current signals and the ratio signal for a single phase to earth high impedance fault inside the protection zone; the single phase operation of the circuit breakers and delayed operation mode of the present invention are adopted; where $T_1$ is the time of fault inception; $T_2$ is the time when the faulted phase circuit breaker of B12 opens; $T_3$ the time when the faulted phase circuit breaker of B11 opens.
Figure 8:
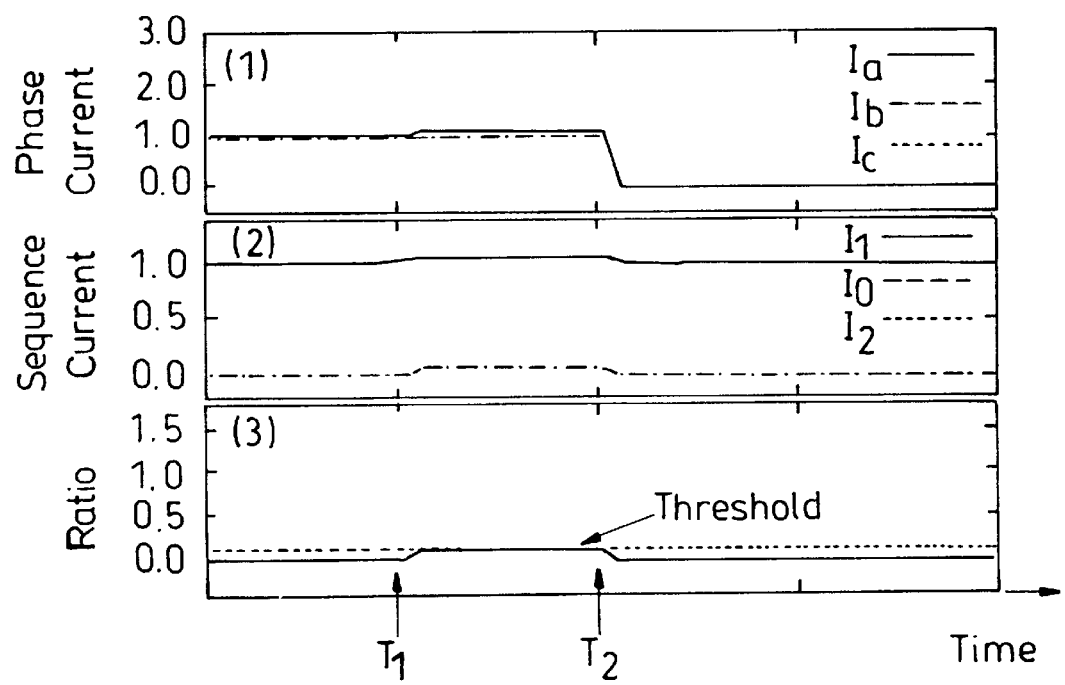
FIGS. 8(1), 8(2) and 8(3) are graphs showing the RMS values of the phase, sequence current signals and the ratio signal for a single phase to earth high impedance fault outside the protection zone; the single phase operation of the circuit breakers and delayed operation mode of the present invention are adopted; where $T_1$ is the time of fault inception; $T_2$ is the time when the faulted phase circuit breaker of B12 opens.

FIGS. 7 and 8 show the system responses to a single phase ('a') in zone and out zone high impedance faults respectively w%hen single phase breaker operation is applied. As shown in FIGS. 7(1) and 8(1), there is little changes in magnitudes of the faulted phase current between the period of fault inception at time $T_1$ the breaker operation at time $T_2$, consequently the sequence current as shown in FIGS. 7(2) and 8(2). This is because that the high impedance fault path draws little fault current in this fault condition. Consequently, the ratio signal is kept below the threshold as shown in both FIGS. 7(3) and 8(3).

However, in the case of in zone fault as shown in FIG. 7(2), after the opening of the faulted phase of circuit breaker B12 at the end 'R' to trip the faulted phase, the increase in the level of the negative and zero sequence currents and decrease in that of the positive sequence current is clearly evident. Consequently, the signal ratio quickly increase to a level over the threshold as shown in FIG. 7(3) and enables the end 'S' apparatus R11 to make a tripping decision for this in zone fault condition and subsequently, the faulted phase of circuit breaker B11 opens at time $T_3$.

For the corresponding out zone fault condition, the opening of the 'R' end faulted phase of circuit breaker B21 on L-2 isolates the fault from line section L-1. During this period, the signal ratio is kept well below the threshold as shown in FIG. 8(3), therefore, the apparatus R11 at the end 'S' does not respond to this out zone fault condition.

Case 4 Three Phase Fault Condition With Three-phase Breaker Operation

Figure 9:
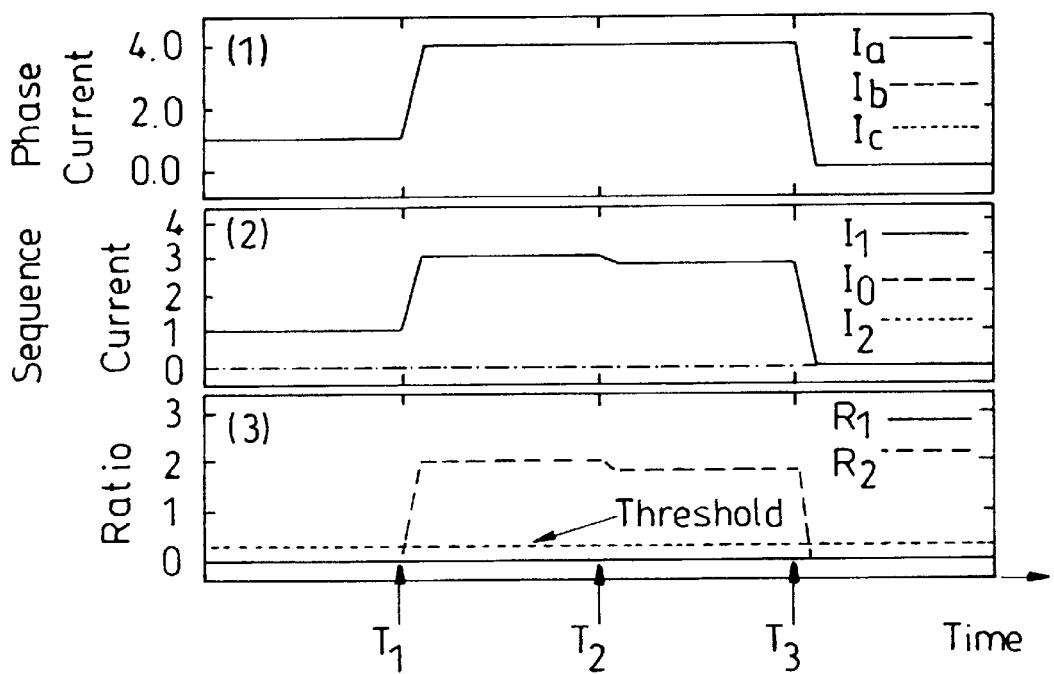
FIGS. 9(1), 9(2) and 9(3) are graphs showing the RMS values of the phase, sequence current signals and the ratio signals for a three phase to earth fault inside the protection zone; the three phase operation of the circuit breakers and delayed operation mode of the present invention are adopted; where $T_1$ is the time of fault inception; $T_2$ is the time when the three phase circuit breaker B12 opens; $T_3$ the time when the three phase circuit breaker B11 opens.
Figure 10:
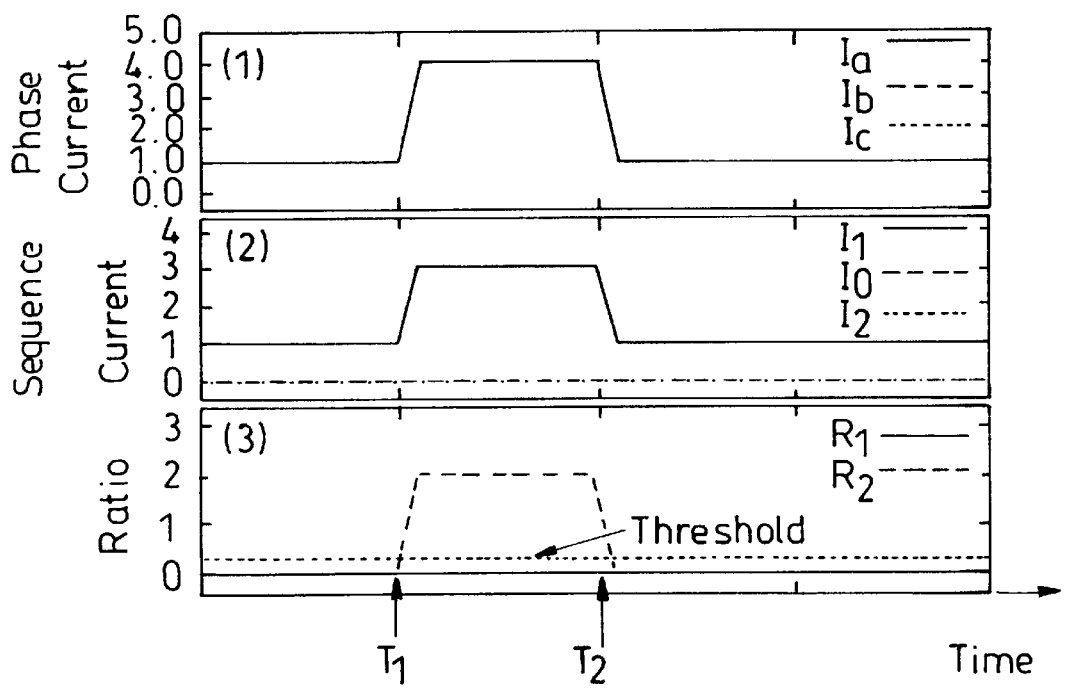
FIGS. 10(1), 10(2) and 10(3) are graphs showing the RMS values of the phase, sequence current signals and the ratio signals for a three phase to earth fault outside the protection zone; the three phase operation of the circuit breakers and delayed operation mode of the present invention are adopted; where $T_1$ is the time of fault inception; $T_2$ is the time when the three phase circuit breaker B12 opens.

FIGS. 9 and 10 show the responses of the apparatus to the three phase in zone and out zone faults respectively. As shown in FIGS. 9(1) and 10(1), all the three phase currents increase to the same high level after the fault inception at time $T_1$. In both cases, the positive sequence currents increase greatly as shown in FIGS. 9(2) and 10(2). Since these are balanced fault conditions, the zero and negative sequence currents remain as zero. After the opening of the end 'R' circuit breakers, B12 for the in zone fault and B21 for the out zone fault, the positive sequence current stays at high level for the in zone fault condition as shown in FIG. 9(2) and returns to pre-fault level for out zone fault condition as shown in FIG. 10(2). As expected, the signal ratio RI as given in Equation(11) remain below the threshold in both cases through the entire period as shown in FIGS. 9(3) and 10(3). This makes the detection of the circuit breaker operation impossible based on this ratio signal.

However, as shown, the positive sequence current changes drastically during the period as shown in FIGS. 9(2) and 10(2). The ratio signals $R_2$ as given in Equation(12) show the changes in the positive sequence current with respect to its pre-fault level from which the remote in zone and out zone breaker operation can be clearly identified. In the case of in zone fault, the high level of the $R_2$ enables R11 to make a tripping decision and subsequently the breaker B11 opens at time $T_3$ as shown in FIG. 9(3). In the case of out zone fault, the level of the $R_2$ signal returns back to zero after the opening of circuit breaker B21 at time $T_2$ which inhibits the R11 from making a tripping decision.

As previously stated, some system configuration and fault condition does not allow the application of the delayed operation mode. In particular, for system voltage at or above EHV level. In this situation, the apparatus can either adopt the instant operation mode only if required or on-line make the decision to which mode to use adapting to the system and fault condition. In the instant operation mode, the instant opening the end 'S' circuit breaker B11 will open circuit the line at one end, there will be no current measurement available. Therefore, in this operation mode, the apparatus of the invention relies on the measurement of the voltage signals for the detection and identification of remote breaker operation. It is expected that the voltage transducers are installed on the line side of the circuit breaker which is the normal practice.

Cases 5 and 6 (FIGS. 11–14) are examples demonstrating the performance of the apparatus under instant operation mode using voltage measurements.

Case 5 Phase to Phase Fault Condition With Three-phase Breaker Operation

Figure 11:
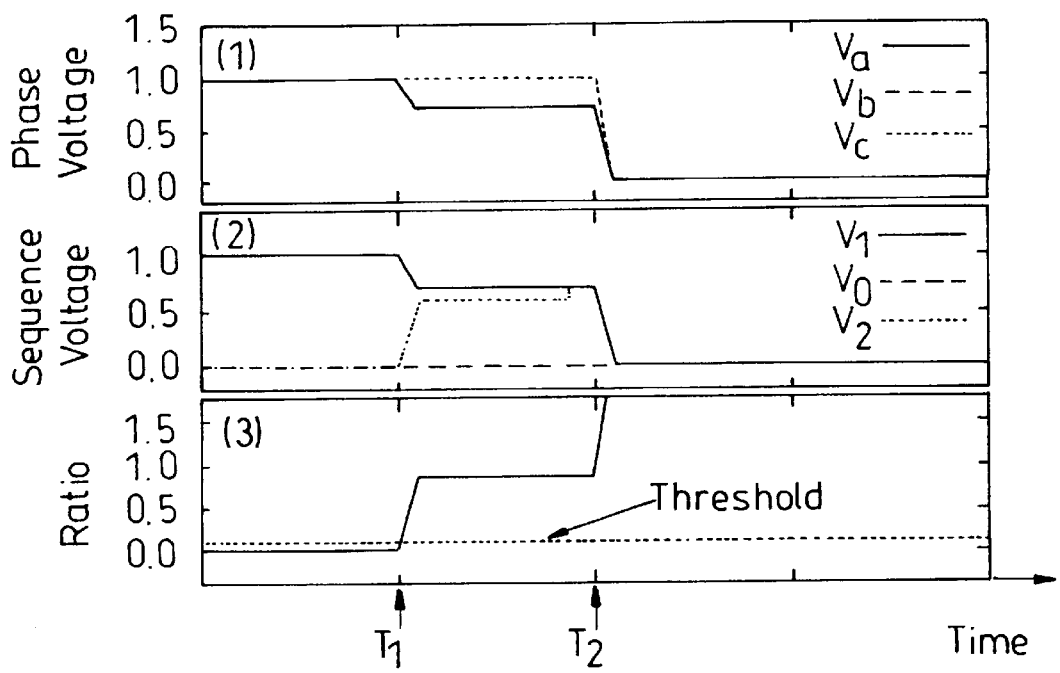
FIGS. 11(1), 11(2) and 11(3) are graphs showing the RMS values of the phase, sequence voltage signals and the ratio signal for a phase to phase fault inside the protection zone; the three phase operation of the circuit breakers and instant operation mode of the present invention are adopted; where $T_1$ is the time of fault inception; $T_2$ is the time when the three phase circuit breakers B11 and B12 open.
Figure 12:
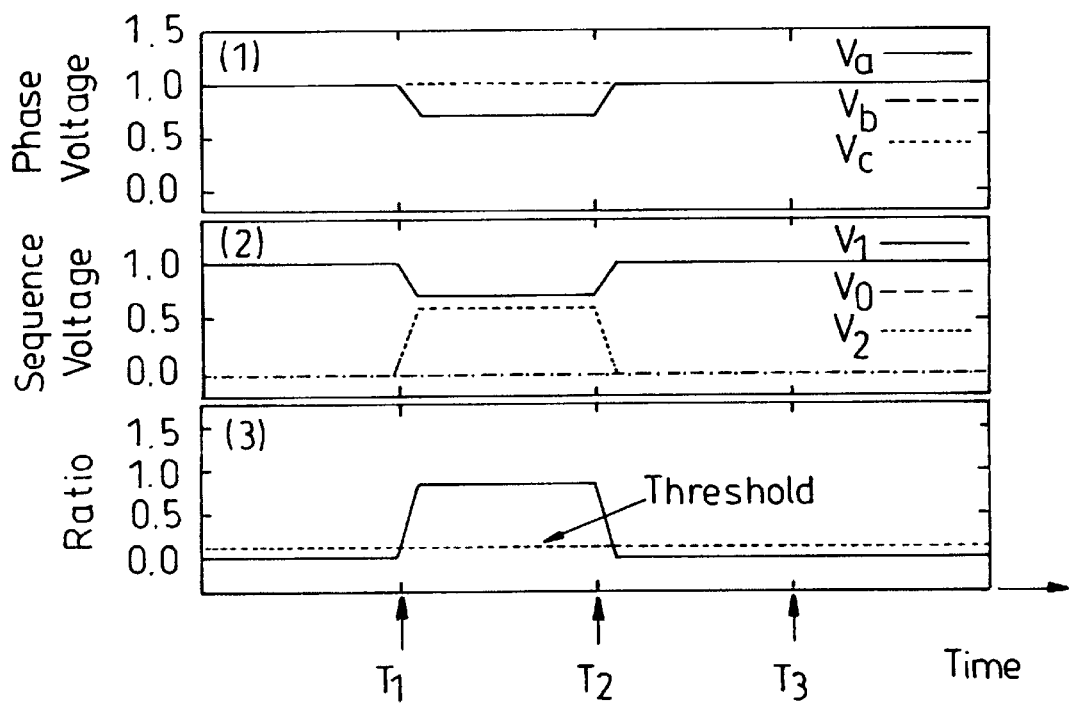
FIGS. 12(1), 12(2) and 12(3) are graphs showing the RMS values of the phase, sequence voltage signals and the ratio signal for a phase to phase fault outside the protection zone; the three phase operation of the circuit breakers and instant operation mode of the present invention are adopted; where $T_1$ is the time of fault inception; $T_2$ is the time when the three phase circuit breakers B11 and B21 open; $T_3$ the time when the three phase circuit breaker B11 closes.

FIGS. 11 and 12 show the responses of the invented apparatus to the in zone and out zone phase to phase ('a'–'b') faults respectively. FIGS. 11(1), 11(2), 12(1) and 12(2) show the phase and sequence voltages during the periods of pre-fault, post-fault with breaker operations at both ends 'S' and 'R'. For the in zone fault case as shown in FIG. 11(2), there is significant drop in the positive sequence voltage after fault inception at time $T_1$. After the opening of the circuit breakers B11 and B12 at both ends of the protected section L-1 at time $T_2$, the sequence voltage signals drop to a level close to zero. As shown in FIG. 11(3), the ratio signal increases to a level over the threshold after fault inception, and further increases to a very high level after the breaker opening. As a result, the apparatus R11 at the end 'S' is inhibited from reclosing for this in zone fault condition.

For the out zone fault case as shown in FIG. 12, the opening of the remote circuit breaker B21 isolates the fault from line section L-1, the system returns back to balanced operation condition. During the period, the positive sequence voltage drops after the fault inception and return close to its pre-fault level after the breaker opening. The negative sequence voltage increases after the fault inception and drops back after the breaker opening. As a result, the signal ratio drops back to below the threshold, which enables the apparatus R11 to reclose the end 'S' breaker B11 at time $T_3$.

Case 6 Single Phase to Earth Fault With Single-phase Breaker Operation

Figure 13:
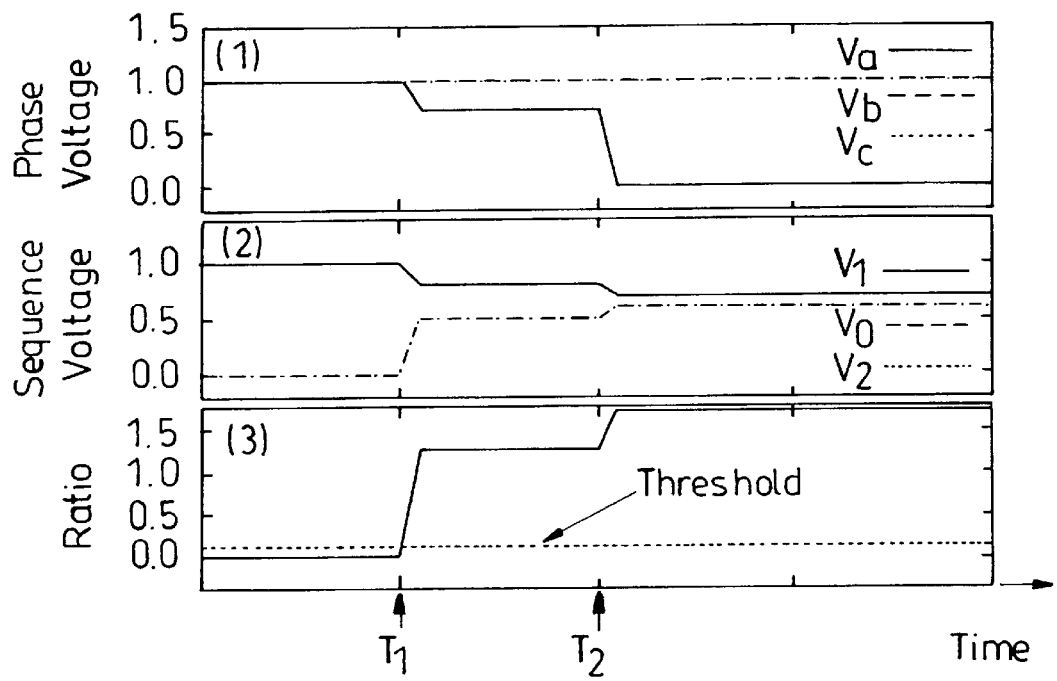
FIGS. 13(1), 13(2) and 13(3) are graphs showing the RMS values of the phase, sequence voltage signals and the ratio signal for a single phase to earth fault inside the protection zone; the single phase operation of the circuit breakers and instant operation mode of the present invention are adopted; where $T_1$ is the time of fault inception; $T_2$ is the time when the faulted phase circuit breakers of B11 and B12 open.
Figure 14:
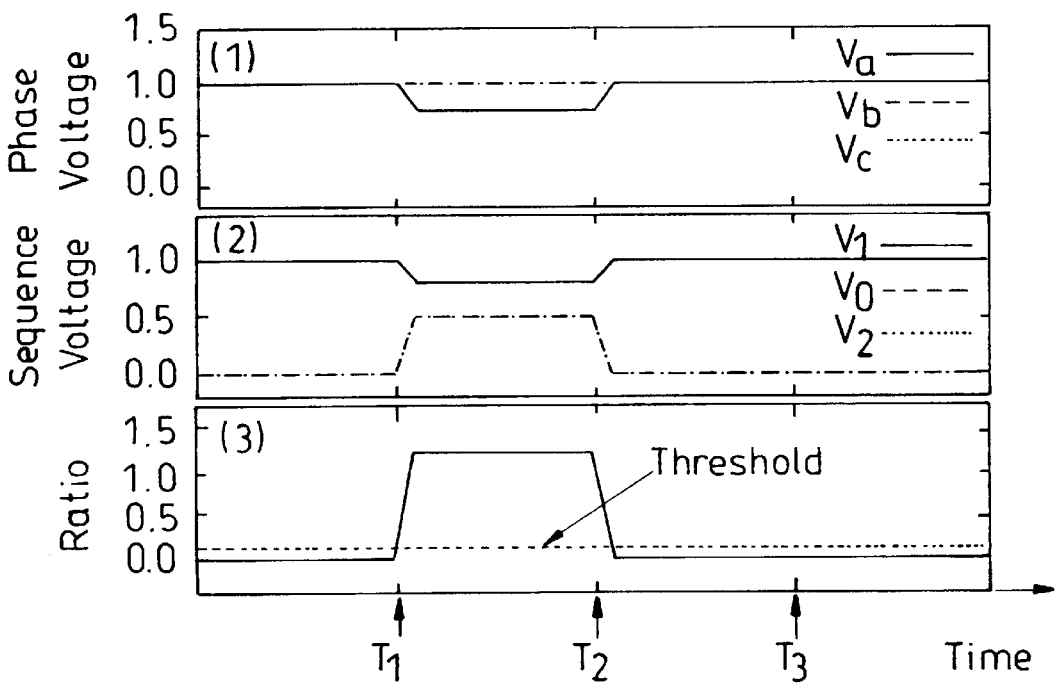
FIGS. 14(1), 14(2) and 14(3) are graphs showing the RMS values of the phase, sequence voltage signals and the ratio signal for a single phase to earth fault outside the protection zone; the single phase operation of the circuit breakers and instant operation mode of the present invention are adopted; where $T_1$ is the time of fault inception; $T_2$ is the time when the faulted phase circuit breakers B11 and B21 open; $T_3$ the time when the faulted phase circuit breaker B11 closes.

FIGS. 13 and 14 show the responses of the apparatus to the in zone and out zone single phase to earth faults ('a'–'e') respectively. In both cases, the single phase operation of the circuit breaker is used. As shown in FIGS. 13(2) and 14(2), at time $T_2$, the faulted phase of the circuit breakers B11 and B12 open for the in zone fault case, and that of the B11 and B21 open for the out zone fault case. For the in zone fault, since the fault still exists on the line section L-1, this results in the significantly high negative and zero sequence voltages and the sustain high level of the ratio signal as shown in FIG. 3(3). As a result, the R11 is inhibited from making a reclosing decision.

On the contrast, the system returns back to balanced condition after the clearance of the out zone fault as shown in FIG. 14(2). Consequently, the apparatus R11 detects this situation and issues a reclosing command to close the circuit breaker B11 at time $T_3$ and the system resumes normal operation.

What is claimed is:

1. A method of protecting a section of a line by providing a local fault protection assembly at one end of the section distal from at least one remote fault protection assembly at another end of the section, each fault protection assembly comprising a circuit breaker, a line signal measurement means for producing a local output signal indicative of a voltage or current on the line, and a signal processing means for processing the local output signal to produce a fault signal in the event that the local output signal indicates a presence of a fault in the line, the method comprising the steps of:

monitoring the local output signal from the signal measurement means at the circuit breaker of the local assembly to detect the presence of the fault within a first zone extending over at least a part of the section from the circuit breaker of the local assembly or outside of the first zone and, in the event that the local output signal is indicative of the fault within the first zone, substantially instantly opening the circuit breaker of the local assembly and, in the event that the fault is outside the first zone, detecting the operation of the circuit breaker of the remote assembly by monitoring the local output signal from the signal measurement means of the local assembly, monitoring the local output signal to determine a fault condition of the section of the line after the circuit breaker of the remote assembly has been operated, and operating the circuit breaker of the local assembly in the event that the fault condition meets a predetermined criterion.

2. The method according to claim 1, and further comprising the step of substantially instantly opening the circuit breaker of the local assembly regardless of whether the fault is detected within the first zone or outside the first zone.

3. The method according to claim 2, and further comprising the step of inhibiting the circuit breaker of the local assembly from reclosing in the event that the local output signal from the signal measurement means indicates that the fault has not been cleared after the operation of the circuit breaker of the remote assembly has been detected.

4. The method according to claim 3, and further comprising the step of reclosing the circuit breaker of the local assembly in the event that the fault is cleared.

5. The method according to claim 1, and further comprising the step of opening the circuit breaker of the local assembly after a predetermined time delay in the event that the fault is detected by monitoring the local output signal which is not within the first zone.

6. The method according to claim 5, and further comprising the step of opening the circuit breaker of the local assembly at an accelerated time without waiting for the predetermined time delay in the event that the operation of the circuit breaker of the remote assembly is detected by monitoring the local output signal which indicates that the fault on the line persists after this operation.

7. The method according to claim 5, and further comprising the step of inhibiting the circuit breaker of the local assembly from opening in the event that the fault has cleared.

8. The method according to claim 1, wherein the step of detecting the operation of the remote fault protection assembly is performed by monitoring the local output signal over time to detect changes in value indicative of opening of the circuit breaker of the remote assembly.

9. The method according to claim 8, wherein the step of detecting the operation of the remote assembly includes the step of determining a delay between detecting the fault and an expected closure or opening of an adjacent remote circuit breaker.

10. The method according to claim 1, wherein the measurement means comprise relays.

11. The method according to claim 1, wherein the predetermined criterion is determined by calculating a first ratio signal $R_1(k)$ according to the following equation:

$$R_1(k) = \frac{\overline{S}_2(k) + \overline{S}_0(k)}{\overline{S}_1(k)}$$

where $\overline{S}_x(k)$ represent root-mean-square (RMS) values of positive, negative and zero sequence quantities for x=1, 2 and 0, respectively.

12. The method according to claim 11, wherein the predetermined criterion is determined by calculating a second ratio signal $R_2(k)$ according to the following equation:

$$R_2(k) = \frac{\overline{S}_1(k) - \overline{S}_{1pre}}{\overline{S}_{1pre}}$$

where $\overline{S}_{1pre}$ is the RMS value of the positive sequence quantity before the fault condition is detected.

13. An apparatus for protecting a section of a line, comprising:
a local fault protection assembly provided at one end of the section distal from at least one remote fault protection assembly provided at another end of the section, each fault protection assembly comprising a circuit breaker, a line signal measurement means for producing a local output signal indicative of a voltage or current on the line, and a signal processing means for processing the local output signal to produce a fault signal in the event that the local output signal indicates a presence of a fault in the line; means for monitoring the local output signal from the signal measurement means at the circuit breaker of the local assembly to detect the presence of the fault within a first zone extending over at least a part of the section from the circuit breaker of the local assembly or outside of the first zone; control means for controlling the circuit breaker of the local assembly so that, in the event that the local output signal is indicative of the fault within the first zone, the control means is operative for substantially instantly opening the circuit breaker of the local assembly and, in the event that the fault is outside the first zone, the monitoring means is operative for detecting the operation of the circuit breaker of the remote assembly by monitoring the local output signal from the signal measurement means of the local assembly, and the monitoring means is further operative for monitoring the local output signal to determine a fault condition of the section of the line after the circuit breaker of the remote assembly has been operated, the control means being operative for operating the circuit breaker of the local assembly in the event that the fault condition meets a predetermined criterion.

14. The apparatus according to claim 13, wherein the predetermined criterion is determined by calculating a first ratio signal $R_1(k)$ according to the following equation:

$$R_1(k) = \frac{\overline{S}_2(k) + \overline{S}_0(k)}{\overline{S}_1(k)}$$

where $\overline{S}_x(k)$ represent root-mean-square (RMS) values of positive, negative and zero sequence quantities for x=1, 2 and 0, respectively.

15. The apparatus according to claim 14, wherein the predetermined criterion is determined by calculating a second ratio signal $R_2(k)$ according to the following equation:

$$R_2(k) = \frac{\overline{S}_1(k) - \overline{S}_{1pre}}{\overline{S}_{1pre}}$$

where $\overline{S}_{1pre}$ is the RMS value of the positive sequence quantity before the fault condition is detected.

16. A method of protecting a section of a line by providing a local fault protection assembly at one end of the section distal from at least one remote fault protection assembly at another end of the section, each fault protection assembly comprising a circuit breaker, a line signal measurement means for producing a local output signal indicative of a voltage or current on the line, and a signal processing means for processing the local output signal to produce a fault signal in the event that the local output signal indicates a presence of a fault in the line, the method comprising the steps of:

a) monitoring the local output signal from the signal measurement means at the circuit breaker of the local assembly to determine location of faults with respect to a first zone extending over at least a part of the section from the circuit breaker of the local assembly;

b) substantially instantly opening the circuit breaker of the local assembly if the local output signal is indicative of the fault within the first zone;

c) monitoring the local output signal to detect operation of the circuit breaker of the remote assembly if the local output signal is indicative of the fault outside the first zone;

d) monitoring the local output signal to determine a fault condition of the section of the line when the local output signal is indicative of operation of the circuit breaker of the remote assembly; and e) outputting a fault signal to open the circuit breaker of the local assembly if operation of the circuit breaker of the remote assembly has been detected and the fault condition meets a predetermined criterion as indicated by the local output signal.

\* \* \* \* \*